US012759806B2

(12) United States Patent
Hyslop

(10) Patent No.: US 12,759,806 B2
(45) Date of Patent: Oct. 13, 2026

(54) SORTING SYSTEM

(71) Applicant: HYSORT LIMITED, Warwickshire (GB)

(72) Inventor: David John Hyslop, Warwickshire (GB)

(73) Assignee: Hysort Limited, Warwickshire (GB)

(*) Notice: Subject to any disclaimer, the term of this patent is extended or adjusted under 35 U.S.C. 154(b) by 0 days.

(21) Appl. No.: 18/574,712

(22) PCT Filed: Jun. 10, 2022

(86) PCT No.: PCT/GB2022/051457
§ 371 (c)(1),
(2) Date: Dec. 27, 2023

(87) PCT Pub. No.: WO2023/275506
PCT Pub. Date: Jan. 5, 2023

(65) Prior Publication Data

US 2024/0351801 A1 Oct. 24, 2024

(30) Foreign Application Priority Data

Jun. 29, 2021 (GB) ...................................... 2109379
Jun. 29, 2021 (GB) ...................................... 2109384

(51) Int. Cl.
*B65G 47/50* (2006.01)
*B07C 3/00* (2006.01)
(Continued)

(52) U.S. Cl.
CPC ............ *B65G 47/506* (2013.01); *B07C 3/008* (2013.01); *B07C 3/06* (2013.01); *B07C 3/08* (2013.01);
(Continued)

(58) Field of Classification Search
CPC ... B07C 3/008; B07C 3/06; B07C 2301/0041; B65G 47/46; B65G 47/49; B65G 43/08; B65G 65/005
(Continued)

(56) References Cited

U.S. PATENT DOCUMENTS 6,323,452 B1 * 11/2001 Bonnet .................. B07C 3/082 209/583
6,652,213 B1 * 11/2003 Mitchell ............. B65G 1/0492 414/284
(Continued)

FOREIGN PATENT DOCUMENTS

EP 3383770 B1 2/2020
JP H10 109743 A 4/1998
(Continued)

OTHER PUBLICATIONS

International Search Report and Written Opinion issued on Dec. 20, 2022 in connection with corresponding International Application No. PCT/GB2022/051457.

*Primary Examiner* — Molly K Devine
(74) *Attorney, Agent, or Firm* — Stout, Uxa & Buyan, LLP; Donald E. Stout

(57) ABSTRACT

A system and method for sorting items. the system and method including a control arrangement configured to receive information about at least one item to be sorted. a track arrangement including at least one sort location, and at least one sorter carrier. wherein the or each sorter carrier is configured to move along the track arrangement and carry an item to be sorted, and the or each sorter carrier further includes a discharge arrangement configured to discharge the item to be sorted. Additionally, a sorter carrier is provided. Sorting systems and methods configured to use independently controlled sorting carriers which travel through a framework to sorting destinations on one or more levels.
(Continued)

wherein the sorter carriers are configured to vary the point at which they discharge an item, the system further including a system controller which is configured to use the item dimensions and position on the sorting carriers to calculate the discharge position in the framework for the sorting carrier to discharge the item allowing a high density of filling of the chute.

7 Claims, 11 Drawing Sheets

(51) Int. Cl.

| | |
|---|---|
| ***B07C 3/06*** | (2006.01) |
| ***B07C 3/08*** | (2006.01) |
| ***B65G 43/08*** | (2006.01) |
| ***B65G 47/46*** | (2006.01) |
| ***B65G 65/00*** | (2006.01) |

(52) U.S. Cl.
CPC ............. *B65G 43/08* (2013.01); *B65G 47/46* (2013.01); *B65G 65/005* (2013.01); *B65G 2203/0216* (2013.01); *B65G 2203/025* (2013.01); *B65G 2203/0258* (2013.01); *B65G 2203/0291* (2013.01); *B65G 2203/041* (2013.01)

(58) Field of Classification Search
USPC .......................................................... 209/552
See application file for complete search history.

(56) References Cited

U.S. PATENT DOCUMENTS

| | | | | |
|---|---|---|---|---|
| 6,820,561 | B2 | 11/2004 | Soldavini et al. | |
| 9,600,798 | B2 * | 3/2017 | Battles | B25J 9/16 |
| 10,639,678 | B2 | 5/2020 | Ravary et al. | |
| 2014/0142746 | A1 * | 5/2014 | Vegh | B65G 47/34 700/229 |
| 2019/0160493 | A1 * | 5/2019 | Garrett | B07C 3/082 |
| 2019/0185267 | A1 * | 6/2019 | Mattern | B65B 5/105 |

FOREIGN PATENT DOCUMENTS

| | | | |
|---|---|---|---|
| JP | 2019516994 | A | 6/2019 |
| KR | 102010342 | B1 | 8/2019 |

* cited by examiner

SORTING SYSTEM

This specification relates to package sorting. In particular, although not exclusively, this specification relates to an item carrier for use in a package sorting system.

A sorter using independently driven item carriers, either a cross belt or other discharge system, has the ability to move past the sort destination with varying speed. From the carrier's maximum speed to zero at the time of item discharge. Individual carriers can be moved vertically within the machine by a lift allowing multiple levels of sort destinations to be accessed which reduces the floorspace required for the sort destinations and sorter. The carriers travel along different levels between multiple lifts forming a return path for the carrier to come back to collect additional items from one or more item induct points.

Independently driven carriers are a significant part of the cost of the total sorter solution as they each have a controller, sensors, drive motor and power pickup onboard (and possibly energy storage e.g. battery or capacitor).

Carriers slowing down or stopping, to sort an item, prevent other carriers, on the same level, from overtaking. This reduces the overall throughput rate of the sorter. Adding more carriers increases the capacity of the sorting machine up to the point other bottlenecks are reached i.e. the capacity of lifts or item induct stations. Additional carriers, however, increase the cost to the sorter. Finding a way to maximise the throughput of the carriers allows the best combination of capital cost and sorter capacity per hour.

Therefore, a mechanism for maximising the throughput of an item sorting machine has been developed. This may employ a set number of independent carriers, and may vary and optimise, for each item to be sorted, the speed of the item carrier and discharge mechanism before and during the discharge of the item. The innovation uses the item attributes, dimensions and position on the carrier to allow the control system to optimise the carrier drive motors.

In addition, the systems and methods may allow the minimisation of the number of carriers needed to reach the throughput of an item sorting machine, by varying and optimising, for each item to be sorted, the speed of the item carrier and discharge mechanism before and during the discharge of the item. The innovation uses the item attributes, dimensions and position on the carrier to allow the control system to optimise the carrier drive motors.

Further, this specification relates to package sorting. In particular, although not exclusively, this specification relates to systems and methods for sequencing and/or ordering of packages.

Conventional parcel or item sorting machines operate at a constant speed with the items to be sorted transported to the sort destinations on a series of linked carriers or conveyors. Destinations are usually on one level and the items are sorted by applying a force to the item to move it of one side (or the other) of the sorter and into a chute or other destination.

The sort destination could be a gravity chute, container or glace. The sorter carriers or conveyor move past the fixed destination at a constant speed. When a carrier needs to eject or sort out an item the carrier (or conveyor divert mechanism) activates at a fixed point relative to the destination, and the item is moved into the destination (chute) opening. The opening must therefore be wider than the largest width of item to be sorted to allow the carrier to continue its forward motion with respect to the destination opening whilst being able to sort out the item successfully without jamming. Frequently a funnel is used to guide the item into a narrower chute or destination container (roll cage, stillage, bag or tote etc.).

Items for a particular sorting destination (e.g. a parcel depot, delivery van or shops) enter into the destination in the order that they are inducted onto the sorting machine (on occasions items may recirculate past their destination and be overtaken by other items). Once in a destination chute items are unlikely to overtake however, they are uncontrolled and when a smaller item has room to pass a larger item this may happen. The sequence of items presenting at the end of a chute, or other type of destination, is generally the same as the sequence of induction onto the sorter.

Many sorting machine users have a desire to sequence items to simplify downstream operations.

It is therefore, desirable for a sorting machine to be able to sequence the items sorted.

An aspect of the invention provides a sorting apparatus, the sorting apparatus including a control arrangement configured to receive information about at least one item to be sorted, a track arrangement including at least one sort location, and at least one sorter carrier configured to carry an item to be sorted, the sorter carrier including a drive arrangement, wherein the or each sorter carrier is configured to move along the track arrangement and carry an item to be sorted, and the or each sorter carrier further includes a discharge arrangement configured to discharge the item to be sorted.

Preferably, the information about the or each item to be sorted includes at least the width and length of the item and the position of the item to be sorted on the or each sorter carrier.

Conveniently, the information about the or each item to be sorted is provided by way of a sensor arrangement.

Advantageously, the sensor arrangement includes a camera, vision system, a photocell, and/or a barcode reader.

Preferably, the or each sorter carrier includes a speed control.

Conveniently, the information about the or each item to be sorted is used to determine and control the speed of the carrier and the point of discharge of the or each item to be sorted. This seeks to maximize the throughput of the carrier and sorting system.

Advantageously, the control arrangement is configured to adjust the position of the item on the carrier by way of the discharge arrangement such that it is moved it towards the side of the or each sorter carrier adjacent to the or each sort location prior to arrival at the or each sort location. This seeks to minimise the distance of travel required to discharge the item into the destination and allowing a higher carrier speed.

Preferably, the information about the or each item to be sorted includes the coefficient of friction of and/or mass of the or each item to be sorted.

Conveniently, the information further includes information about the weight of the item to be sorted.

Advantageously, the discharge arrangement of the or each sorter carrier is a belt arrangement.

Preferably, the belt arrangement is perpendicular to the axis of travel of the sorter carrier.

Conveniently, the belt arrangement is controlled, by the control arrangement, to move the item to be sorted on the or each sorter carrier, toward the relevant sort location, towards the side of the or each sorter carrier.

Advantageously, the apparatus includes an item scanning arrangement configured to read information about the or each item to be sorted.

Preferably, the sorting apparatus includes at least a first sorter carrier and a second sorter carrier.

Conveniently, the first sorter carrier is configured to be propelled at a first speed, and the second sorter carrier is configured to be propelled at a second speed.

Advantageously, the first speed is greater than or less than the second speed.

Preferably, the or each sorter carrier includes a power source and a motor.

Conveniently, the power source is a battery.

Advantageously, the track arrangement further includes an arrangement configured to charge the battery in the or each sorter carrier.

Another aspect of the invention provides a method of sorting items, the method including the steps of receiving information about at least one item to be sorted; providing at least one sort location, and providing at least one independent sorter carrier, wherein the or each sorter carrier is configured to move between the or each sort location and discharge an item to be sorted, wherein the or each independent sorter carrier may move at a different speed.

A further aspect of the invention provides a sorter carrier, the sorter carrier including a drive arrangement configured to move the sorter carrier, a discharge arrangement configured to move with respect to the sorter carrier, and a power source configured to provide power to the drive arrangement and discharge arrangement.

Preferably, the drive arrangement comprises wheels.

Alternatively, the drive arrangement comprises a belt or belts.

Conveniently, the discharge arrangement is a conveyor belt, the conveyor belt being perpendicular to the axis of travel of the sorter carrier.

Advantageously, the power source is a battery.

An aspect of the invention provides a sorting system configured to use independently controlled sorting carriers which travel through a framework to sorting destinations on one or more levels, wherein the sorter carriers are configured to vary the point at which they discharge an item, the system further including a system controller which is configured to use the item dimensions and position on the sorting carriers to calculate the discharge position in the framework for the sorting carrier to discharge the item allowing a high density of filling of the chute.

Preferably, the items are placed side by side in the chute, with minimum space between, allowing the parcels to be removed from the front of the chute in the desired sequence whilst taking up a minimum width of sort chute within the framework.

Conveniently, the items position is communicated back to the sorter controller and then made available to and used by the operator or unloading device to pick the items in the predefined sequence.

Advantageously, at the point of discharge, the speed of forward motion of the sorting carrier is variable from zero up to the carrier top speed.

Preferably, the system controller determines the optimum sorting carrier speed at the point of discharge.

Conveniently, the sorter controller is configured to take account of the item dimensions and position on the sorter carrier to vary the speed of forward motion of the sorter carrier at the point of discharge from zero to the top speed of the sorter carrier.

Alternatively, the sorter carrier is configured to take account of the dimensions and positions of items already sorted and the item dimensions and position on the sorter carrier of the current item to be sorted to determine the optimum position and forward speed of the sorter carrier at the point of discharge.

Advantageously, the sort destination in the framework is pre allocated based upon the item dimensions and quantities known for the next sorting period, or on the historically expected item dimensions and quantities with a suitable allowance for reasonable variation.

Preferably, the pre allocation of space for each sort destination in the framework levels allows items to be sorted close by each other thus minimising the destination chute width required and the walking of the unloading operator.

Conventiently, the sorting system further includes an overflow chute or level which can be used where the actual item quantities and and/or dimensions exceed the expected level.

Advantageously, the sorter control system uses the item dimensions, position on the carrier and known desired item sequence to place items into the sort destination chute.

Preferably, the position in the sort destination chute is behind other items already sorted with a lower position in the desired sequence where the framework length and item dimensions allow.

Conveniently, the items position in the chute is communicated back to the sorter controller and then used by the controller and/or operator to pick the items in the predefined sequence.

Advantageously, the desired sequence of removal from the chute is communicated to the operator by a laser or light pick pointer.

Preferably, the desired sequence of removal from the chute is communicated to the operator by a light or series of lights on the chute framework where the number and position of lights activated is in line with the position of the item to be removed next in the sequence.

Conveniently, the desired sequence of removal is communicated to the operator by screen or monitor displaying a picture of the item to be removed.

Alternatively, the desired sequence of removal from the chute is communicated to the operator by a combination of the features described above.

Advantageously, the sorting carriers are captive within the framework.

A sorter using independently driven carriers within a framework of one or more levels has the ability to sort items into destination chutes allowing an operator to remove the items in a desired sequence from the front of the chutes whilst minimising the overall length of the sorter. It is envisaged that the independently driven carriers may be captive within the framework, and may be constrained only to move therewithin.

The sorter controller uses the item dimensions and/or position on the carrier to determine the optimum discharge point within the framework (and the optimum speed of forward movement of the carrier at the point of discharge of the item, this can range from zero to the top speed of the carrier). The sorter controller also uses the desired sequence of the items and the position within that sequence of each item sorted to determine the sort position of the next item to be sorted.

BRIEF DESCRIPTION OF THE DRAWINGS

An exemplary embodiment of the present invention is illustrated by way of example in the accompanying drawings in which like reference numbers indicate the same or similar elements and in which.

Figure 1:
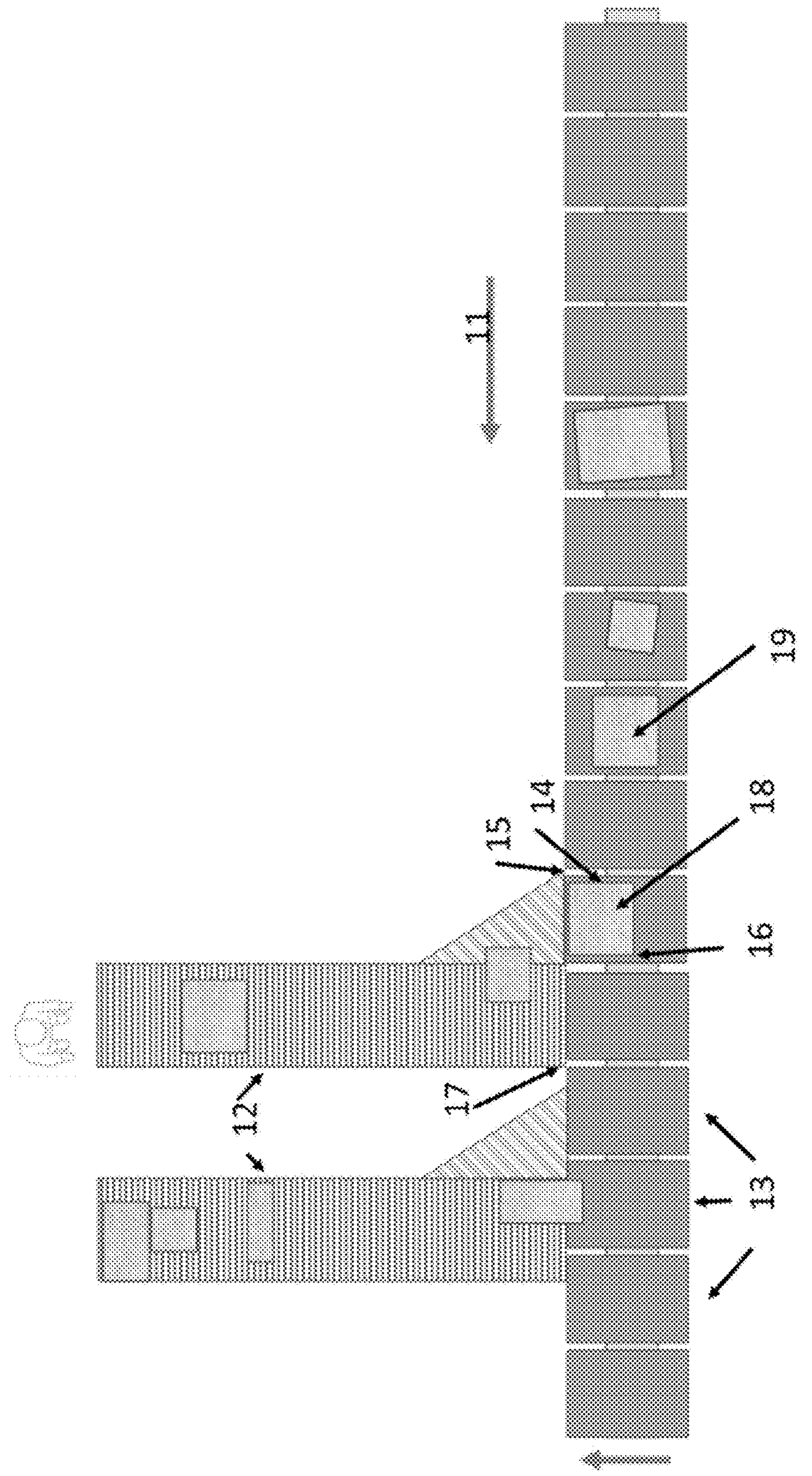
FIG. 1 shows a prior art sorting apparatus.

Referring firstly to FIG. 1, there is shown a conventional prior art sorter which is continuously moving in direction 11 perpendicularly to destination chutes 12.

Particularly, FIG. 1 shows a conventional sorter with destination chute width greater than the width of the largest item to be sorted to allow for the speed of travel of the carrier as it sorts and moves past the destination simultaneously.

Items are transported on the interconnected carriers 13 and discharged in the direction of the discharge mechanism into the destination chutes. Each chute has a throat wider than the maximum width of items allowed on the sorter so that the item can always be discharged fully within the time between when the trailing edge 14 of the item passes the chute opening position 15 and the time the furthest part of leading edge of the item 16 reaches the other side of the chute opening 17.

For a given maximum item size the speed and capacity of the sorter can be increased by widening the entry to the destination chute (increasing sorter length and cost) or the sorter length can be reduced by slowing down the sorter, reducing throughput. Increasing the speed of discharge helps to reduce the destination width however there are practical limits to this.

Items 18 and 19 shown in FIG. 1 are the same size but have been inducted into different positions on the carriers shown. The time taken for the carrier discharge belt to fully discharge item 18 will be less than the time taken to discharge item 19 as it is further away from the destination chute so the discharge belt has further to travel.

Sorters of the general type as shown in FIG. 1 tend to fire the discharge belt at fixed positions. i.e. when the trailing edge of the discharge belt has reached the start of the chute opening and the opposite corner of the discharge belt when looked at in plan view will reach the other side of the carrier before the chute opening is passed this allows items of any size which fit on the carrier to be sorted successfully irrespective of their position on the carrier after being inducted. Some sorters can allow items to straddle multiple carriers (effectively making one larger carrier) but the destination chute openings will be designed to be wide enough to accommodate that mode of operation.

Figure 2A:
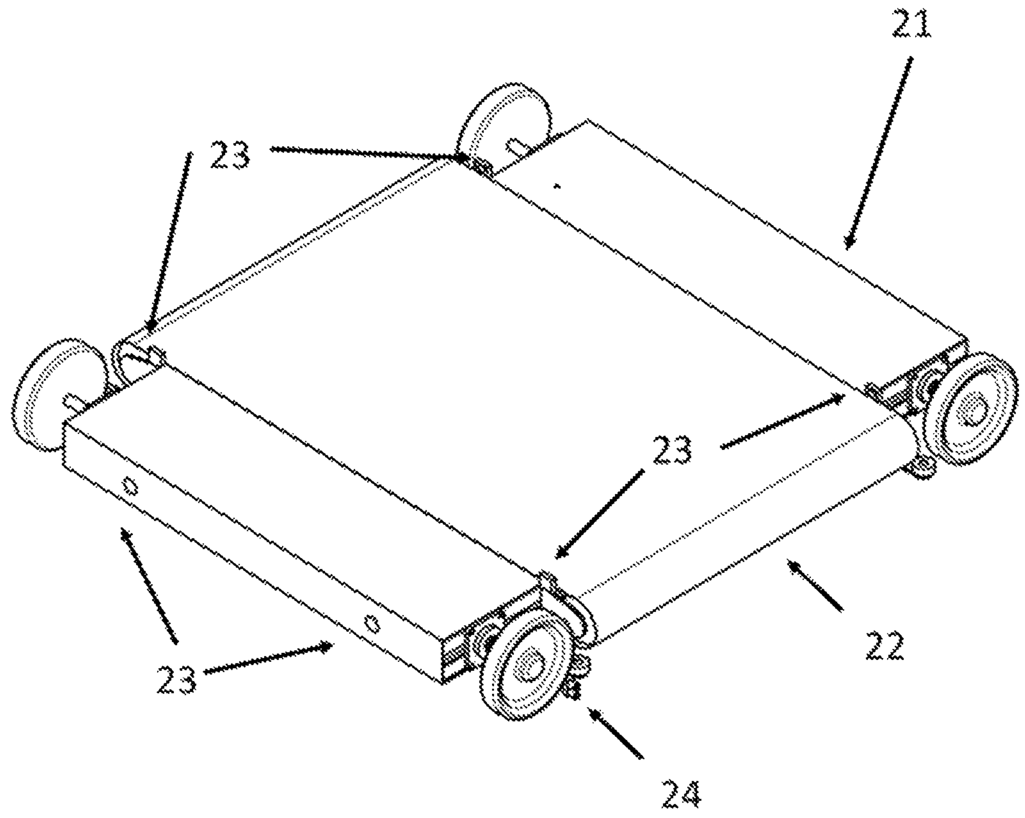
FIG. 2*a* shows an exemplary sorter carrier within which the present invention may be deployed.

Turning now to FIG. 2*a*, there is shown a sorter carrier 21 with a discharge mechanism 22. In the example shown in FIG. 2*a*, the discharge mechanism is a conveyor belt driven across the carrier perpendicular to the direction of travel of the carrier.

The sorter carrier 21 shown in FIG. 2*a* includes a number of features, each of which will be discussed in turn below.

The sorter carrier 21 may include an apparatus configured to drive the sorter carrier 21 in both the forward and reverse direction. Such an apparatus may be a motor or motors. Additionally, the sorter carrier 21 may include an apparatus configured to drive the discharge belt or discharge mechanism to eject the item into the sort destination. As with the drive apparatus, this may be a motor or motors.

Further, the sorter carrier 21 may include an apparatus configured to control the movement and position, along with item loading and discharge, collision avoidance and communication with the other system controllers of the sorter carrier 21. This control apparatus may be a microprocessor controller or PLC, or suitable alternative.

The sorter carrier 21 may also include sensors 23 to detect the position of the sorter carrier 21 within a rail structure, along with other parameters such as overhang of product and collision avoidance. In addition to that discussed above, the sorter carrier 21 may include an optional energy store, which may include or comprise a battery or capacitor, and a power pick-up mechanism 24 to power the carrier or to recharge the energy store.

In the case of the sorter carrier 21 shown in FIG. 2*a*, the wheels are fixed, that is to say that they are not capable of 'steering'. Such a sorter carrier 21 may, for example, include one or more steering axes to enable the wheels of the sorter carrier 21 to steer and thus the sorter carrier 21 be able to move along curved rails.

In addition, the sorter carrier 21 may be low profile, that is to say the overall height of the sorter carrier may be minimised, to allow for an item with a large height to be transported on the sorter carrier 21. As can be seen from the rail arrangement of the sorting machine in FIG. 3 (discussed below), a first sorter carrier 21 may need to pass under a moving further sorter carrier 21, and if an item with a large height is to be moved within the sorting machine, there is a possibility that the top of the item may foul or catch on the sorter carrier 21 moving thereabove.

It may therefore be advantageous for the overall height of the sorter carrier 21 to be relatively low in order to avoid collisions with other sorter carriers 21 in a sorting machine.

Figure 2B:
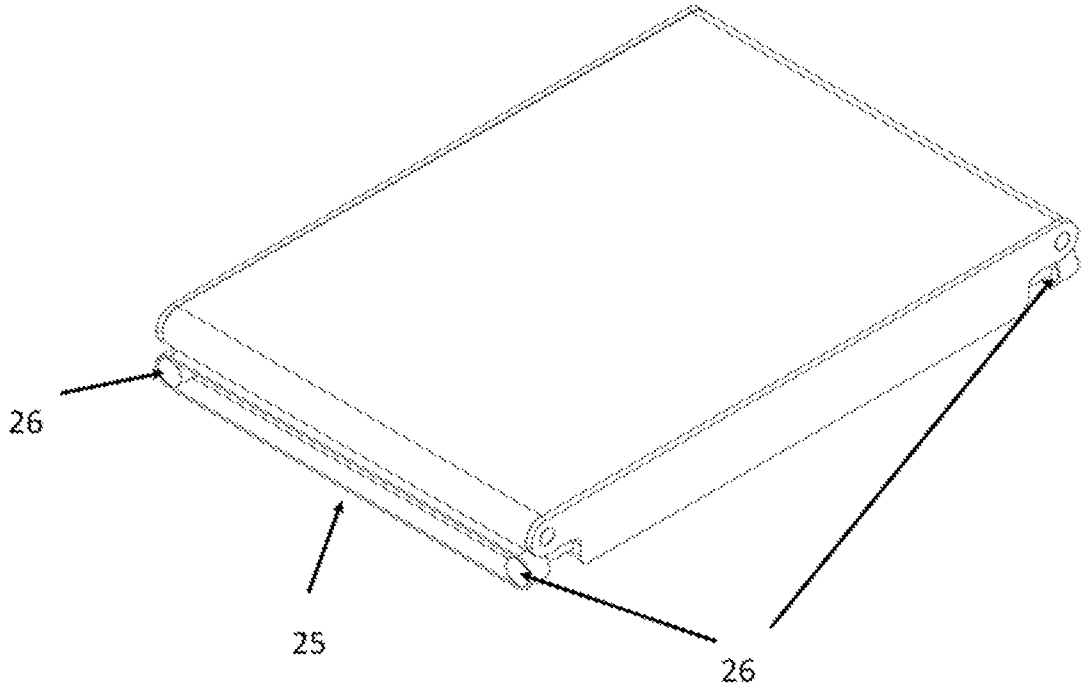
FIG. 2*b* shows an alternative, exemplary sorter carrier within which the present invention may be deployed.

Turning now to FIG. 2*b*, there is shown an alternative carrier with tank tracks instead of wheels. On this version a timing belt 25 (the tank track) is driven between the wheels 26 (drive pulleys) giving a large contact area with the rail. If needed multiple wheels/pulleys can be placed along the length of the track to press the belt down against the rail.

It is envisaged that such an alternative carrier may be used in a sorting machine which may employ a continuous track, that is to say that the track forms a loop or circuit. Such a track may also be sloping, curved, or multi-level. In a situation where the track is multi-level, a curved, inclined, or curved an inclined track may be used to allow the sorter carrier to move between levels of the machine. Such a track may be used as an alternative to the lift shown in FIG. 3 and discussed below.

It is also envisaged that a sorter carrier 21 similar to that shown in FIG. 2*a* may be used in a sorting machine having a continuous track, with the sorter carrier 21 having steering axles on the wheels thereof to allow the sorter carrier 21 to move around curved sections of the machine.

Figure 3:
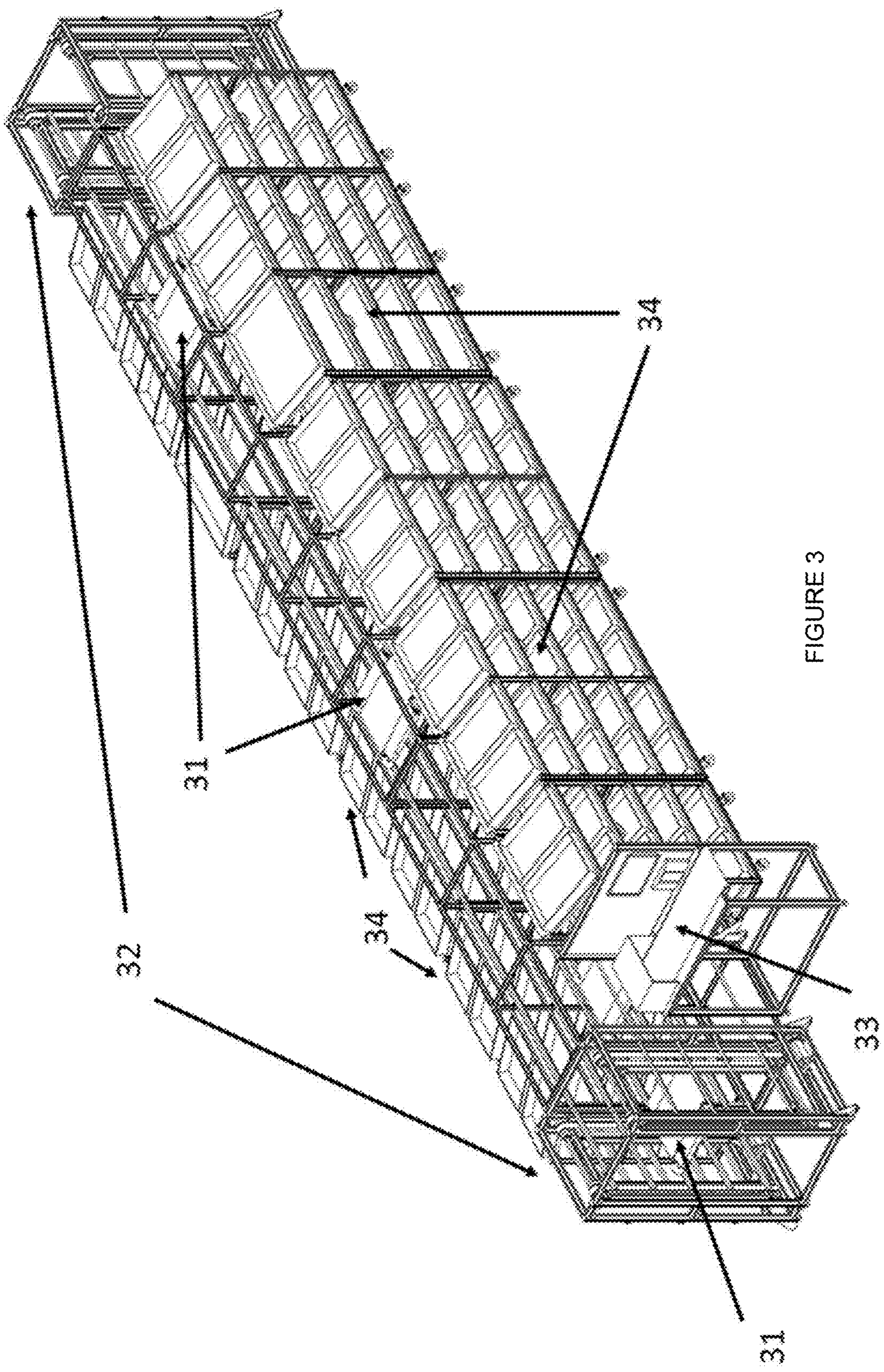
FIG. 3 shows an exemplary sorting machine using a number of carriers within which the present invention may be deployed.

FIG. 3 shows multiple carriers 31 in a sorting machine consisting of lifts 32 to move carriers between levels, item induct position 33, and five levels of sort destinations 34 in this example the destinations are totes but they could be chutes, boxes, bags etc.

It will now be described how the carriers 31 receive an item to be sorted from the induct station.

The cycle may begin with a carrier 31 at the induct position. An item is placed onto the induction belt 33. A barcode on the item may be scanned, either by the operator using a hand-held scanner or by an automatic scanner whilst the item is moving over the induction belt 33. The controller may use the data from the barcode to look up a database to determine the items intended destination. The database may also give the item attribute data such as weight, dimensions and coefficient of friction. The sorter controller passes the items destination to the carrier controller along with any other data by infrared or radio frequency communication. Bluetooth, WiFi or other RF protocols can be used.

The carrier may then check that the item is not overhanging either end of the carrier belt and that the sensors on the carrier belt are clear. If the item is overhanging a warning appears for the operator to reposition the item. If the item is not overhanging the carrier it is ready to move off towards the lift 31. The carrier controller detects if the lift rail is not in place or if an obstruction (most likely another carrier) is detected by its sensors. When the carrier is clear to move it moves onto the lift. The lift controller has been informed by the main sorter controller (or the lift shares the main sorter controller) what level to take the carrier and item to. Before the lift moves to the destination level. The vision system connected to the main sorter controller captures a picture of the item on the carrier. Once the image is captured the lift may begin to move to the destination level. The vision system works out the effective dimensions of the item and the position on the belt.

Once the lift has completed its move to the destination level the induct level is now available to receive another carrier. The main controller calculates the optimum discharge parameters of the item from the carrier and communicates these to the carrier controller. In a variant, the sorter communicates basic information and the carrier determines the optimum discharge speed and the like. Once the first carrier has moved of the lift towards its destination the vision system can capture the image of the item on a second carrier if it has arrived.

The first carrier proceeds towards the sort destination. This may be on the current level of the carrier or on the induct level. If it is the induct level then the carrier will proceed directly to the opposite end of the machine and move over the return lift before proceeding to the sort destination. If the destination is on the current level the carrier may drive at top speed towards the destination. When at an appropriate distance from the destination the carrier begins to decelerate to the discharge speed between top speed and zero m/s. The time at which this deceleration starts is the beginning of the discharge time ('DT'). At a point along the path the carrier fires the discharge belt, or mechanism, to offload the item into the destination.

The discharge belt may be a conveyor belt driven at 90 degrees to the direction of travel of the carrier and this drives the item from the carrier into the destination tote, chute or other destination.

The point the carrier starts deceleration, the deceleration rate, the point at which the discharge belt starts and stops have all been determined by the controller taking into account the item attribute data and effective dimensions and position of the item on the carrier. The item attribute data and the effective dimensions are discussed in more detail, and with reference to FIG. 4, below.

Once the item has been fully discharged the carrier re-accelerates to top speed to continue its journey to the next lift, induct point or other point in the system. The time to discharge ('DT') is complete once the carrier has reached its desired speed for the onward journey. It is to be understood that if the carrier is close to the return lift or induct point the carrier may not reach top speed before stopping at the next lift or induct point.

The carrier travels over the return lift back to the induct station level. The lift controllers, which may be separate controllers or the main sorter controller ensure only one carrier is on the lift at a time by signalling their status to the carriers so the carriers may have to stop and wait before entering the lifts. The carrier controller uses its sensors to detect any obstacles along the way and avoid collisions or to detect when the lift is not available.

Returning to a discussion of the items being introduced into the system, the item barcode may contain attributes information, or an identification allowing these item attributes, including the destination where the item is to be sorted, to be looked up in a database on a host system which may, for example, be a warehouse management system. Any relevant attribute data is passed to the sorter controller and on to the carrier.

The capacity of the system will now be discussed. The time taken by the carrier to move around the loop and complete a sorting cycle depends upon its speed driving to lifts, destinations and induct points, its acceleration and deceleration profiles at the various positions, the time to discharge the item ('DT') and the time to induct the item. Additionally, the carrier may have to wait for a lift or for another carrier which may be blocking its path.

The system throughput per hour therefore depends upon the average cycle time of a carrier. Adding more carriers to the sorter will increase the throughput until the lifts or other positions become a bottleneck. Once the throughput of the sorter reaches the bottleneck capacity of the lifts or other positions the number of carriers can be minimised by reducing the cycle time of a carrier thereby saving capital cost.

The present invention reduces the carrier cycle time by reducing the average DT time, which as discussed above is the time taken for the carrier to, decelerate, discharge the item and re-accelerate. The DT can be varied depending upon the item size, position on the belt and the coefficient of friction between the belt and item. It does not have to be fixed but can be optimised for each item as the carriers are independent of each other and can overtake on different levels. This is unlike conventional sorters where the carriers are on the same level and connected together.

Accuracy of sorting is of paramount importance to sorter users. Items which miss the destination and land in the neighbouring destination may be sent hundreds of miles across the country only to have to be returned at cost and to the detriment of customer satisfaction.

Figure 4:
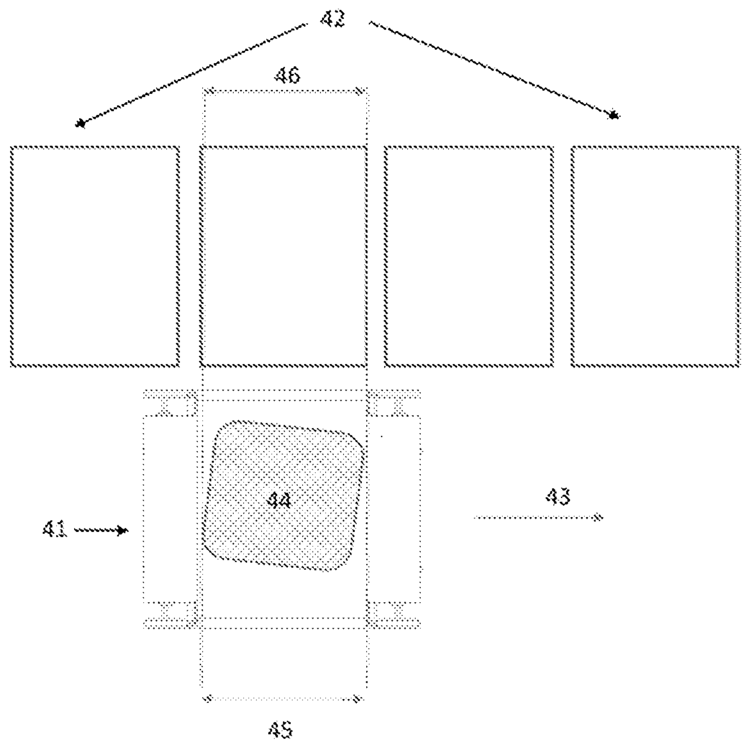
FIG. 4 shows a top view of a carrier and item to be sorted as it passes by a group of sort destinations.

Turning now to FIG. 4, it will be discussed how time and position matter. FIG. 4 shows a carrier 41 moving perpendicular to an array of destinations 42 in the direction of travel 43 and carrying an item to be sorted 44. If the carrier is stationary the item will be successfully sorted into the destination by firing the discharge mechanism provided the effective width 45 is less than the width of the destination 46. The effective width should always be slightly smaller than the destination width to allow the item to fit easily into the destination. If the effective width is greater than the destination width the item is highly likely to jam or be missorted.

Figure 5:
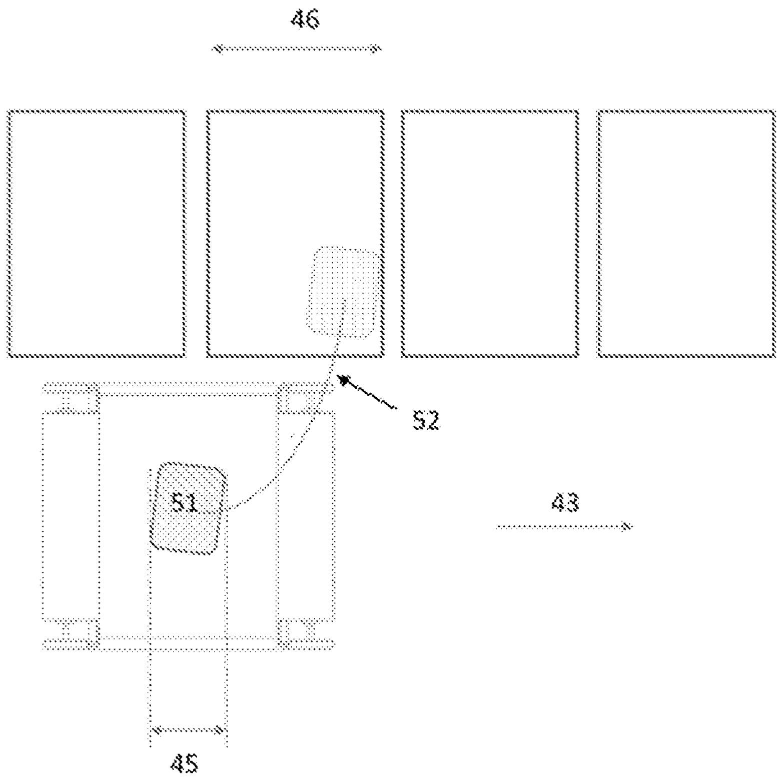
FIG. 5 shows a representation of the locus of travel of an item successfully sorted to a destination by a carrier moving past a row of sort destinations.

FIG. 5 is diagrammatic representation of the locus of travel of an item successfully sorted to a destination by a carrier moving past a row of sort destinations at a speed low enough to allow a successful sort.

Figure 6:
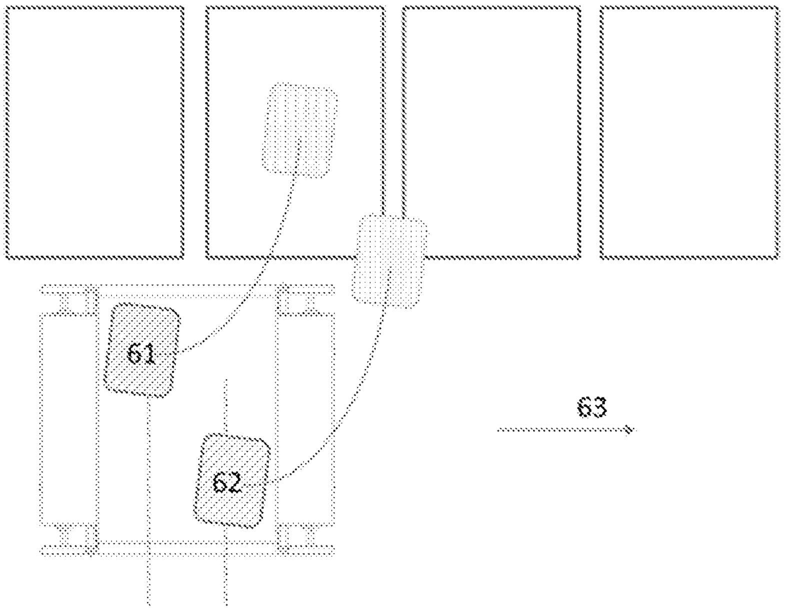
FIG. 6 shows a representation of the locus of travel of an item when positioned in two places on a carrier.

FIG. 6 is diagrammatic representation of the locus's of travel of an item when positioned in 2 different places on a carrier showing both successful and unsuccessful sort attempts as the carrier moves past a row of sort destinations;

FIG. 5 shows an item 51 which is smaller than the item 44 of FIG. 4. FIG. 5 also shows the locus of travel 52 of the item 51, into the destination when the carrier discharge speed is fixed and there is an acceptable positive speed of the carrier in the direction of travel 43. The larger the effective width 45 of the item 51, compared to the destination width 46, the harder it is for the item to successfully hit the target destination whilst the carrier is moving at this speed.

FIG. 6 shows a further scenario, detailing the effect of an item being in a different position on the carrier for a given discharge and carrier direction 63 and speed. The position of item 61 and its locus of travel into the destination result in a successful sort however, if the item was at the position 62 it would result in a failure if the discharge belt is activated at the same time as when sorting item at position 61. Item 62 would be correctly sorted if the discharge belt was fired earlier. If the carrier were to stop at the destination it would not matter what position the items were in so long as they were on the discharge belt and the discharge belts width and the effective width of the item were less than the width of the destination.

To date sorters on the market use a fixed speed of carrier moving passed destinations or stop at the destination.

This innovation is to use the item attributes of its width, length, coefficient of friction and its position on the carrier to maximise the forward speed of the carrier and timing of the activation of the discharge mechanism to reduce the total time to successfully discharge an item into a destination. The total time to discharge includes the time lost by decelerating from the original carrier speed to the discharge drive speed, the time driving at the new speed (which could be zero), the time to discharge the item and time lost reaccelerating to the desired speed. These actions can be in series or overlapping The attributes of width, length and coefficient of friction could be passed from a host system to the sorter controller or the dimensions and effective dimensions can be measured using photocells and timers, a vision system or other sensors somewhere on the sorter or carrier prior to the destination being reached. The sorter controller then calculates the best carrier speed and discharge point to successfully sort the item into the destination.

Destination attributes (principally width but also coefficient of friction, orientation, existing fill etc) can also be used by the control system.

The fundamental difference between the innovation and traditional sorters (Prior art) is the ability of the innovation to vary the speed the carrier as it passes by the destination for each sorting action. This allows the carrier to take account of the dimensions, position and other attributes of the item to determine the optimal carrier and discharge speeds thereby minimizing the number of carriers required (reducing cost) or maximising the sorter throughput.

Figure 7A:
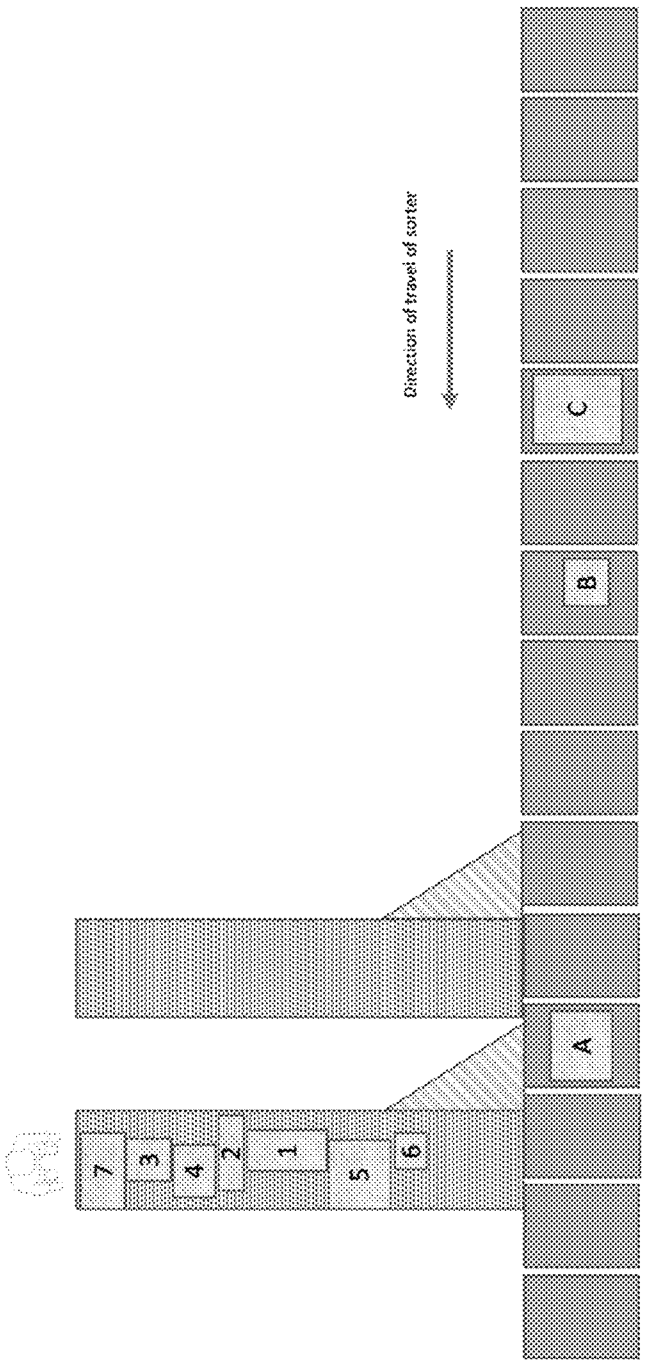
FIG. 7*a* shows a prior art sorting apparatus with long destination chutes.

Referring now to FIG. 7*a*, there is shown a conventional sorter with destination chutes where items are not sequenced.

In FIG. 7*a*, the chutes have a width greater than the width of the largest item to be sorted to allow for the speed of travel of the carrier as it sorts and moves past the destination simultaneously. Items being sorted are placed in the chute largely in the sequence of induction onto the sorter (if a chute is blocked at the time an item is ready to be sorted it can be recirculated and sorted into the chute the next time around). Any overtaking in the chute is uncontrolled and unlikely.

In this conventional chute the operator cannot access the parcels in the desired sequence 1, 2, 3 . . . etc. as the items further up the chute are blocked by the items immediately in front of the operator.

Figure 7B:
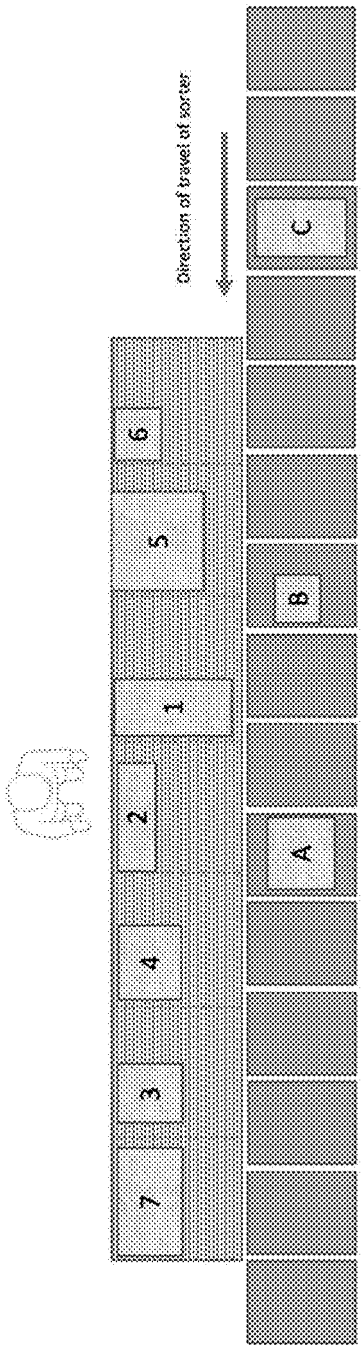
FIG. 7*b* shows a prior art sorting apparatus with a wider chute.

FIG. 7*b* shows an alternative way of presenting the operator at the end of a chute with the ability to load in a predefined sequence. This example has a very wide chute, but not as necessarily as long, where items are sorted across width of the chute so that all item can present at the end, in front of the operator, and be accessed in sequence. This wide chute has multiple fixed discharge points, in the same way the sorter in FIG. 7*a* has, where the sorter controller can eject an item.

This results in a number of fields over the width of the sort destination chute where items can land when sorted. Effectively multiple narrower chutes are combined to make one super wide chute for each sort destination. Small items sorted in this way use the same width of chute as wider items resulting in gaps between smaller items and underutilisation of the chute width.

This solution is poor because the operator has to walk along the wide chute to reach the items. Such a sorter has extremely poor floor space utilisation and is expensive due to its long length.

Two example scenarios will now be discussed, in which prior art sorting apparatuses may be employed.

In a first example scenario, a parcel handling company may receive a large lorry full of randomly loaded parcels and unload the lorry onto a sorting machine which sorts to multiple vans for onward customer delivery. The vans are given an efficient route based upon the delivery addresses of the parcels. Ideally the van would be loaded in reverse drop sequence so that the driver did not have to hunt for parcels at each delivery stop. On a conventional sorting machine, the chutes fill up with a sequence of parcels generally sequenced as they are unloaded from the lorry resulting in imperfect sequence of van loading or a laborious time consuming secondary manual sequencing process prior to loading the delivery van.

In a second example scenario, a book distribution warehouse replenishes multiple retail outlets with books, either picked from stock or just arrived at the warehouse, by sorting the books on a sorter with multiple destination chutes each representing one retail store. The picking and book delivery process results in a random and imperfect sequence of books being inducted onto the sorting machine and so an imperfect sequence in each chute. At the end of the chutes the books are packed into large cartons and dispatched to the retail store. In the retail store the operator wishes to load the shelves by genre and then alphabetical order of author but the carton he opens has books in a random or imperfect order as that is how they were presented in the chute of the sorter. This makes the stocking of shelves more time consuming.

It is therefore desirable to address these issues.

Returning now to FIG. 2*a*, there is shown a sorter carrier 21 with a discharge mechanism 22. In the example shown in FIG. 2*a*, the discharge mechanism is a conveyor belt driven across the carrier perpendicular to the direction of travel of the carrier.

The sorter carrier 21 shown in FIG. 2*a* includes a number of features, each of which will be discussed in turn below.

The sorter carrier 21 may include an apparatus configured to drive the sorter carrier 21 in both the forward and reverse direction. Such an apparatus may be a motor or motors. Additionally, the sorter carrier 21 may include an apparatus configured to drive the discharge belt or discharge mechanism to eject the item into the sort destination. As with the drive apparatus, this may be a motor or motors.

Further, the sorter carrier 21 may include an apparatus configured to control the movement and position, along with item loading and discharge, collision avoidance and communication with the other system controllers of the sorter carrier 21. This control apparatus may be a microprocessor controller or PLC, or suitable alternative.

The sorter carrier 21 may also include sensors 23 to detect the position of the sorter carrier 21 within a rail structure, along with other parameters such as overhang of product and collision avoidance. In addition to that discussed above, the sorter carrier 21 may include an optional energy store, which may include or comprise a battery or capacitor, and a power pick-up mechanism 24 to power the carrier or to recharge the energy store.

In the case of the sorter carrier 21 shown in FIG. 2*a*, the wheels are fixed, that is to say that they are not capable of 'steering'. Such a sorter carrier 21 may, for example, include one or more steering axes to enable the wheels of the sorter carrier 21 to steer and thus the sorter carrier 21 be able to move along curved rails.

In addition, the sorter carrier 21 may be low profile, that is to say the overall height of the sorter carrier may be minimised, to allow for an item with a large height to be transported on the sorter carrier 21. As can be seen from the rail arrangement of the sorting machine in FIG. 8 (discussed below), a first sorter carrier 21 may need to pass under a moving further sorter carrier 21, and if an item with a large height is to be moved within the sorting machine, there is a possibility that the top of the item may foul or catch on the sorter carrier 21 moving thereabove.

It may therefore be advantageous for the overall height of the sorter carrier 21 to be relatively low in order to avoid collisions with other sorter carriers 21 in a sorting machine.

Turning now to FIG. 2*b*, there is shown an alternative carrier with tank tracks instead of wheels. On this version a timing belt 25 (the tank track) is driven between the wheels 26 (drive pulleys) giving a large contact area with the rail. If needed multiple wheels/pulleys can be placed along the length of the track to press the belt down against the rail.

It is envisaged that such an alternative carrier may be used in a sorting machine which may employ a continuous track, that is to say that the track forms a loop or circuit. Such a track may also be sloping, curved, or multi-level. In a situation where the track is multi-level, a curved, inclined, or curved an inclined track may be used to allow the sorter carrier to move between levels of the machine. Such a track may be used as an alternative to the lift shown in FIG. 3 and discussed below.

It is also envisaged that a sorter carrier 21 similar to that shown in FIG. 2*a* may be used in a sorting machine having a continuous track, with the sorter carrier 21 having steering axles on the wheels thereof to allow the sorter carrier 21 to move around curved sections of the machine.

Figure 8:
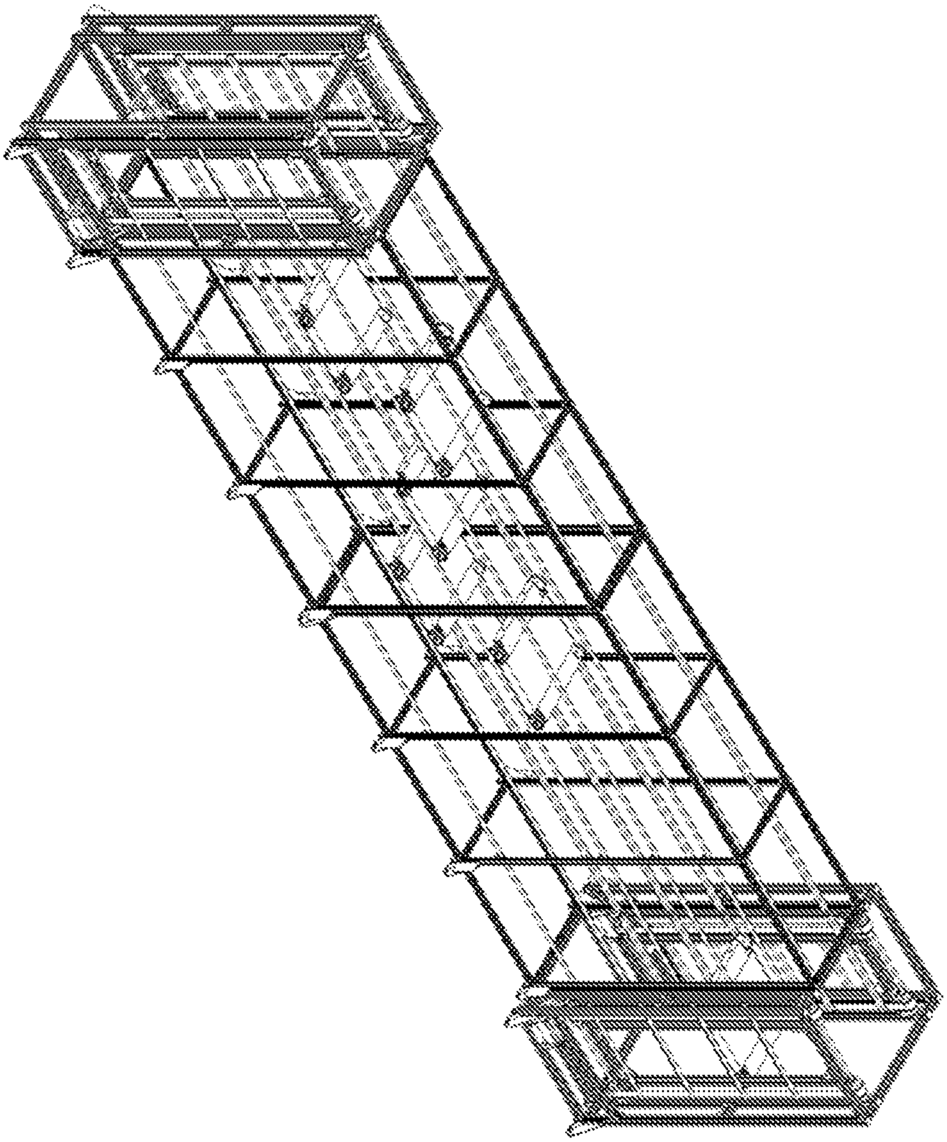
FIG. 8 shows a diagrammatic representation of an exemplary sorting machine using a number of carriers within a framework within which the present invention may be deployed.

FIG. 8 shows a sorting machine utilising multiple carriers 31 which travel over multiple levels 32 using lifts 33. The carriers can stop or slow down at any desired sorting point to discharge the item to be sorted into a chute arranged perpendicular or at an angle to the direction of travel of the carriers at each level of the sorter. The chute is not shown. The sorter carrier takes into account the position previously sorted items were placed into the chute, the dimensions of the item to be sorted and the position the item has taken up on the carrier to determine the optimum position to discharge the item and if possible, what forward speed the carrier may move at. Frequently the carrier forward speed will be zero to ensure good positional accuracy of the item when sorted.

The item induct position can be anywhere along the length of the sorter and is not shown in FIG. 8.

FIG. 7*b* demonstrates that it is possible for a conventional sorter to sort items with a desired sequence into fixed chutes and presenting the items to the operator in such a way that they can be removed in the desired sequence i.e. 1, followed by 2, followed by 3, and then 4, 5, 6, and then 7.

This occupies a large amount of space and the operator needs to walk a long way to unload the chutes.

Figure 9:
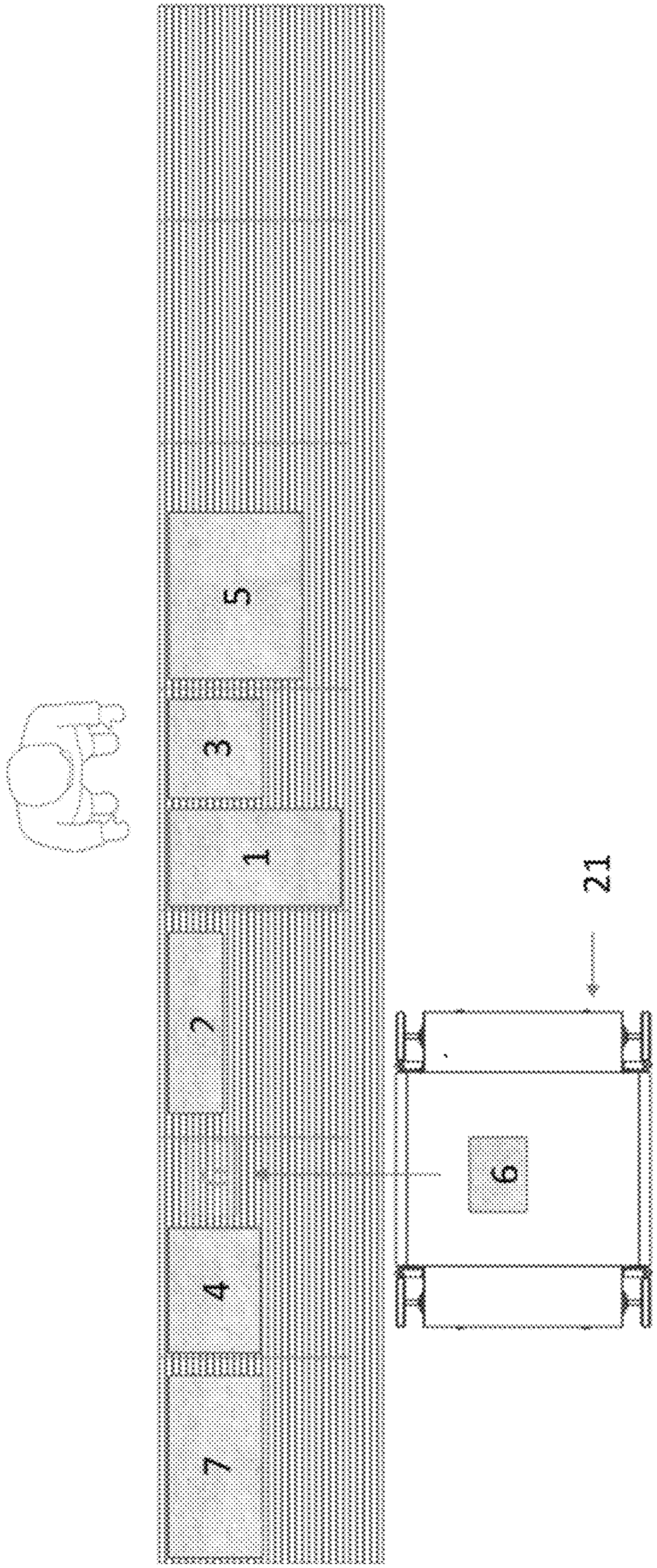
FIG. 9 shows a top view of a carrier and item to be sorted as it passes by a group of sort destinations.

Turning now to FIG. 9, there is shown an example of where a sorter carrier which contains the invention has placed parcels in a chute. By taking account of the width of the item and the position the item was placed on the sorter carrier the carrier can discharge an item into a chute to take advantage of any space remaining in the width of the chute following the sortation of an earlier item.

Where the number and desired sequence of removal of the items is known for each sort destination, prior to the sort taking place, the sorter controller can utilise remaining space in the length of a chute by placing an item which is higher in the sequence of removal behind an earlier sorted item The item marked 2 in FIG. 9 has had an item marked 5 placed behind it. The sorter will place the first item (parcel 2) into the chute and store the dimensions and position data of that item. Items of various sizes may be placed adjacent to the first item into the chute and their size and position (parcels 3 and 1) stored by the sorter controller.

When an item is inducted onto a carrier whose position in the sequence is lower (i.e., it needs to be unloaded from the chute before the other items sorted) that item will also be allocated to a position where the item will fall to the front of the chute with no other item preventing the operator removing it first. When an item is inducted onto a carrier (parcel 5) whose position in the sequence for removal is higher than that of an item already in the chute the sorter controller will determine if it can place the item behind the item already in the chute. The controller will use the data stored about the size and position of the items already in the chute, the size and position of the item on the carrier and the overall length, width and chute design to determine if it will fit behind any items already in the chute. Only items higher in the desired sequence may be placed behind lower sequence items. When the lower sequenced items at the front of the chute are removed the item behind can move forward in the chute and removed when the operator has removed all of the other items lower in the sequence.

If more than one position in the chute behind a number of items is possible the carrier will use the position behind the item with the highest position in the sequence as this leaves the items with a lower position in the desired removal sequence available for the remaining items.

An alternative strategy would be to use as much space or capacity in each chute when selecting which chute to select. This may be of importance when seeking to optimise space utilisation.

Where an item inducted onto a carrier is wider than one item already in the rack it can be placed into the rack behind two or more adjacent items provided, they all have a position in the sequence lower than the new item.

When the operator removes items from the front of the chute in the desired sequence the parcels behind roll, slide, or are moved forward so that they can be accesses in turn.

The sorter controller may be configured periodically to have fixed framework positions for each sorter destination. By way of an example, parcel sorter sorting to van rounds may allocate a first van to the same 2 m section of the framework of the sorter across all levels. A second van may be allocated to the adjacent section of the framework, with a third van next to that, and so on as desired.

This will be the same for the next day, week etc until the sorter is reconfigured. These chute positions will most likely utilise a physical part of the framework (e.g. a supporting column or separation plate) to separate items from the adjacent sort destination. If over a period of time the relative volume of items for the round of the first van is reduced but the round of the second van increases the widths of chute or number of chute levels allocated to each van round could be adjusted in the sorter controller's configuration.

It is possible to have a destination utilise a width of 2 m on 4 levels whilst allowing the 5th level to be allocated to a different sort destination. Most likely the adjacent sort destination. In any given sorting period the number of items for a sort destination, the dimensions of the items and the sequence they will be inducted will vary. As a result, the widths of chute will likely be configured to leave some extra space for a variation in the number or size of items for any given sort period or shift. In extreme cases this extra or contingency space may not be enough and overflow items will be sent to a predefined rework area where they can be manually processed for later consolidation with the remainder of the items for the sort destination.

Where the number and size of items for a destination is known the minimum volume of chute could be calculated. However, the random or imperfect sequence that the items will be inducted onto the sorter means that this minimum volume is extremely unlikely to be enough to take all items particularly where items to be removed first are inducted towards the end of the sort period. By determining the likely number and size of items for a given sort destination a volume of chute can be calculated, taking into account the width, length and number of levels which gives a high statistical probability the chute will be large enough for a random induct sequence for an acceptable number of sorting shifts. The overflow area and operation can be minimised by increasing the extra or contingency space allocated per destination cute. Following an analysis of the historic size and numbers of parcels for a van round or store it may be possible to determine that 20% extra space in each destination chute will be sufficient 95% of the time without the need to send a parcel to the overflow or 30% extra space sufficient 99% of the time.

Alternatively, the sorter can dynamically allocated sort destinations at the start of each sorting period where the number and size of items is known by a host system and communicated along with the desired sequence and where the sequence of induction to the sorter is imperfect or random. The items will still be inducted in the imperfect sequence and placed into the dynamically allocated chute. In extreme cases the volume of chute allocated may still not be big enough or the sequence particularly unfavourable and an overflow area may be utilised.

FIGS. 7*b*, 9, 10, and 11 show how a randomly inducted set of items (marked 1 to 7) may be sorted in a progressively more space-efficient manner. In the examples shown in FIGS. 7*b*, 9, 10, and 11, a randomly inducted set of items which traditionally requires 7 m of chute width and sorter length can be sorted into a 1 m width over 5 levels whilst maintaining the ability of the operator to unload them from the chute in the desired sequence by a multi-level sorter with independently driven carriers utilising the invention. It is to be understood that other scenarios are envisaged, and that the length and number of levels required may be in dependence upon a number of factors.

FIG. 7*b* shows what may be achieved with a conventional sorter. Progressing from this, FIG. 9 shows what can be achieved by measuring dimensions and position of the item on the carrier and using the carrier to adjust the position of sorting to take advantage of the width of the items. FIG. 9 shows that the same items may be sorted into a narrower area than that shown in FIG. 7*b*.

Figure 10:
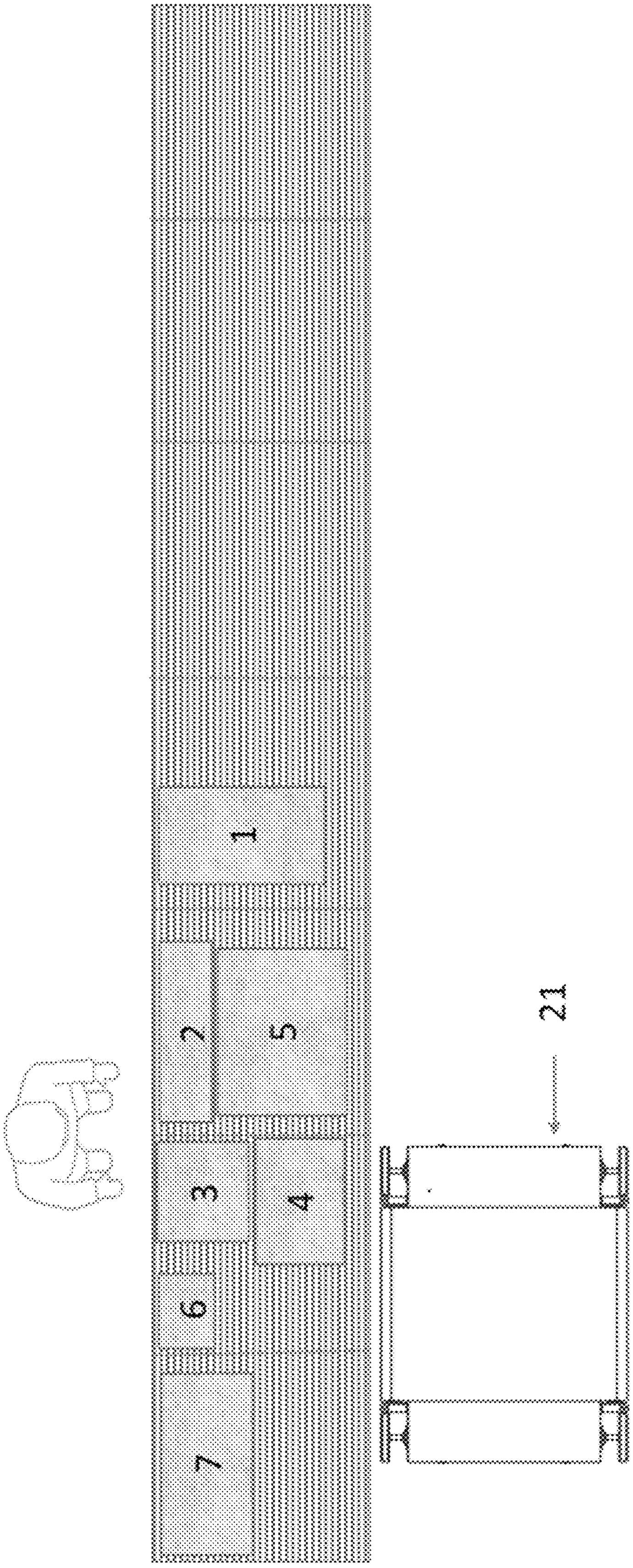
FIG. 10 shows a diagrammatic representation of the top view of a carrier which has sorted items keeping items higher up in the sequence behind items lower in the sequence allowing items to be removed from the chutes in the desired sequence.
Figure 11:
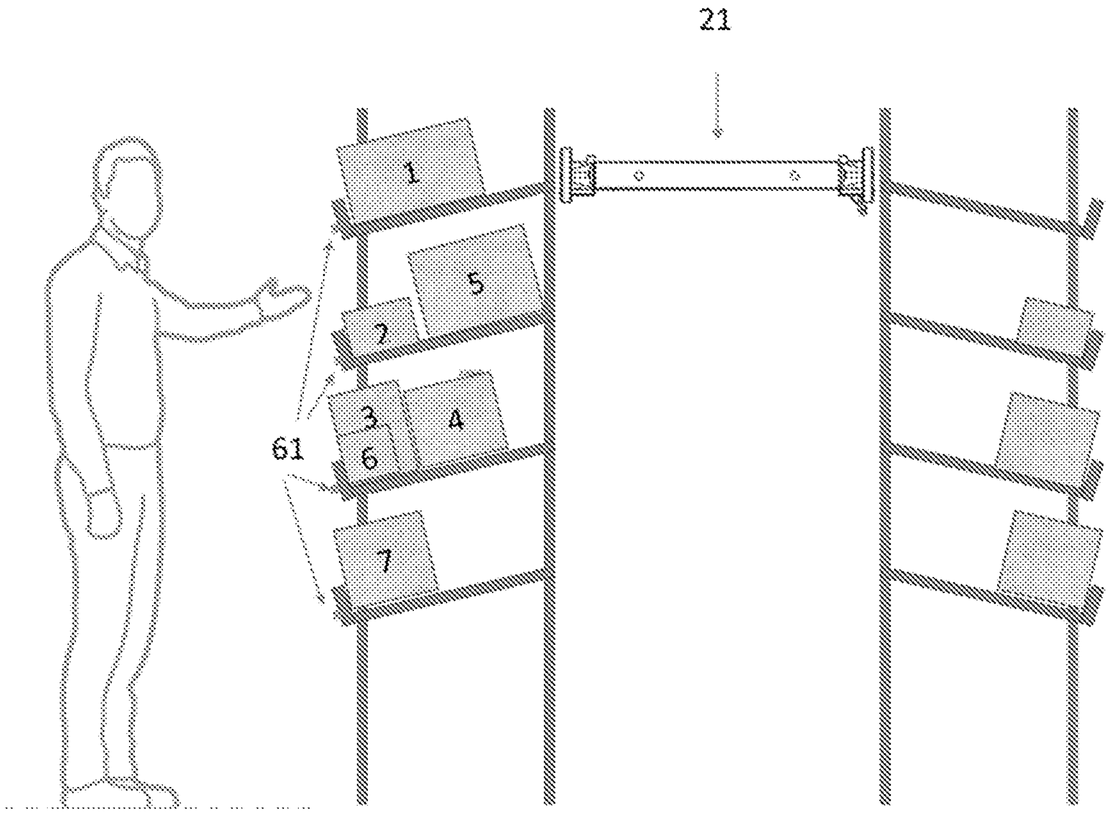
FIG. 11 shows a diagrammatic representation of the side view of a carrier which has sorted items keeping items higher up in the sequence behind items lower in the sequence allowing items to be removed from multiple level chutes in the desired sequence.

FIG. 10 shows that the same items can be sorted into an even narrower area by allowing items higher in the desired sequence to be placed behind items lower in the sequence and FIG. 11 shows the arrangement of parcels in FIG. 10 when the chute area is allocated vertically.

Comparing to the scenario demonstrated in FIG. 7*b* where the operator must remove items from a very wide area, the operator in FIG. 11 has a much narrower chute area and can remove the items in sequence without much walking. Therefore, in the example solution shown in FIG. 11, the overall area needed for the sort destination is reduced, and this arrangement may improve operator productivity.

When the removal of the items from the chute is required either at the end or during the sorting process an operator attends the front of the destination chute. The sequence of items to be removed is indicated by the sorter controller to guide the operator to carry out the task in the desired sequence. A row of light bulbs or LED's may be attached to the front of the framework at each level, with the lights spaced along the width of each chute is shown on FIG. 11.

The lights 61 corresponding to the position of the next item in the sequence to be removed are activated by the sorter controller taking into account the level, position along the width of the chute and width of the parcel. A wide item has more lights activated than a narrow item. Alternatively, a light pointing device can shine onto the level and position along the destination chute width of the next item to be removed. Additionally, a monitor may display a picture, either taken at the point if induction or earlier, of the item to assist the operator to identify the item. Once an item has been removed the controller may detect this with a sensor. Alternatively, an operator may push a button or scan a barcode making the controller aware the item has been removed and it indicates the next item to be taken.

Conventional sorters on the market use a fixed speed of carrier moving past destinations and do not stop at the destination. This prevents them placing items immediately adjacent to other items or between the gaps created by existing items in the chute.

While the invention has been illustrated and described in detail in the drawings and preceding description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. Each feature of the disclosed embodiments may be replaced by alternative features serving the same, equivalent or similar purpose, unless stated otherwise. Therefore, unless stated otherwise, each feature disclosed is one example of a generic series of equivalent or similar features.

In the claims, the word “comprising” does not exclude other elements or steps, and the indefinite article “a” or “an” does not exclude a plurality. Any reference signs in the claims should not be construed as limiting the scope

The invention claimed is:

1. A sorting system including:

a control arrangement configured to receive information about at least one item to be sorted;

a track arrangement including at least one sort destination, the track arrangement forming part of a framework;

at least a first sorter carrier and a second sorter carrier configured to carry an item to be sorted, each sorter carrier including a drive arrangement;

each sort destination comprising one or more chutes, glacé, totes, roll cage, stillage, or other containers into which the item can be discharged; wherein each sorter carrier is configured to move along the track arrangement and carry an item to be sorted;

each sorter carrier further including a discharge arrangement configured to discharge the item to be sorted at a discharge position;

the first sorter carrier being configured to be propelled at a first speed and the second sorter carrier being configured to be propelled at a second speed;

wherein the control arrangement determines information about each item to be sorted by way of a sensor arrangement connected to the control arrangement, the determined information including effective dimensions of the item to be sorted and the position of the item to be sorted on each sorter carrier;

wherein the determined information and the dimensions and positions in the sort destination of any items already sorted are used to determine and control the first and/or second speed and the discharge position of the or each item to be sorted, so as to place the item adjacent to or behind the items already sorted; and store the dimensions and position of the item in the sort destination; and wherein a desired sequence of removal from the destination chute of the multiple items to be sorted is known and wherein the control arrangement is configured to arrange the items to be discharged, which arrive out of the desired sequence whereby to utilize remaining space in the sort destination by placing an item which is later in the desired sequence of removal behind any item earlier in the desired sequence of removal and placing items which are earlier in the desired sequence of removal than items already in the sort destination at a position in the front of the sort destination.

2. The sorting system of claim 1 wherein the framework comprises multiple levels and the sorting carriers are arranged for travel through the framework to sorting destinations on one or more levels.

3. The sorting system of claim 1, wherein an item’s position in the sort destination is communicated by the control arrangement to and used by an operator or unloading device to pick items in a predefined sequence.

4. The sorting system of claim 3 wherein the item’s position and predefined sequence of removal from the sort destination is communicated by a system of lights, pick pointer, RF terminal or computer monitor.

5. The sorting system of claim 1, wherein a sort destination in the framework is pre-allocated by the control arrangement based upon the determined information and quantities known for a next sorting period, or on the historically expected determined information and quantities.

6. The sorting system of claim 5, further including an overflow chute or level which can be used where actual item quantities and/or effective dimensions and/or sequencing requirements prevent all items from fitting in the allocated sort destination.

7. The sorting system of claim 1 wherein the framework comprises multiple levels and the sorting carriers are arranged for travel through the framework to sort destinations at one or more levels.

* * * * *